Dec. 26, 1944.    H. M. PFLAGER    2,365,723
RAILWAY TRUCK STRUCTURE
Filed March 16, 1942    2 Sheets-Sheet 2
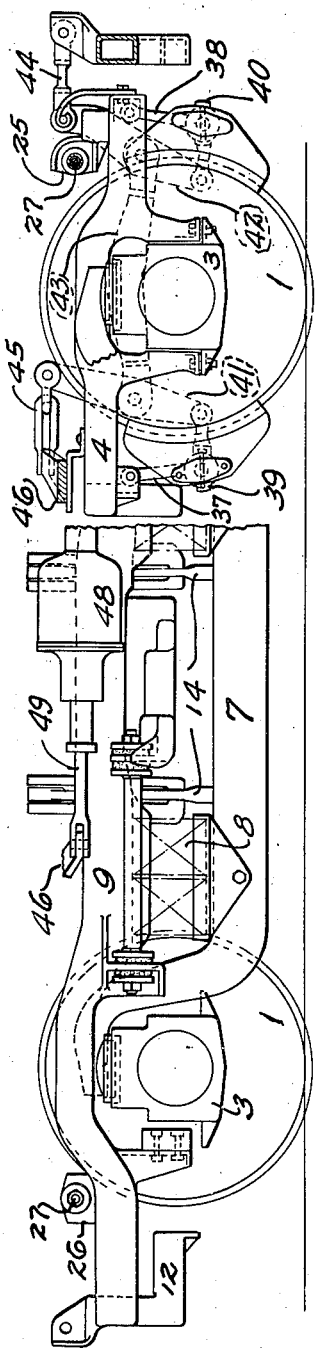
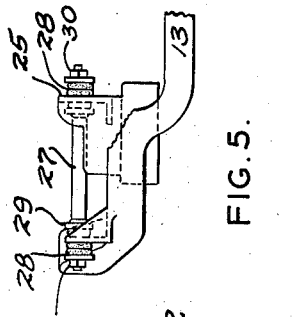
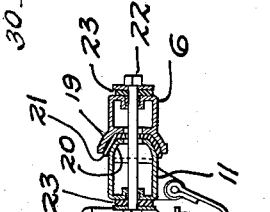
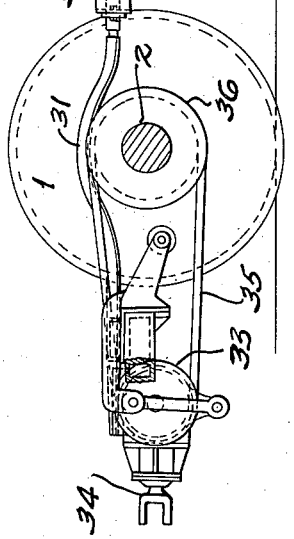
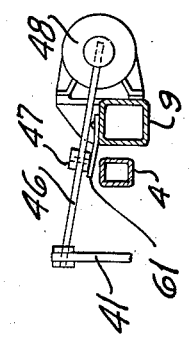
INVENTOR.
HARRY M. PFLAGER
BY Rodney Bedell
ATTORNEY Patented Dec. 26, 1944

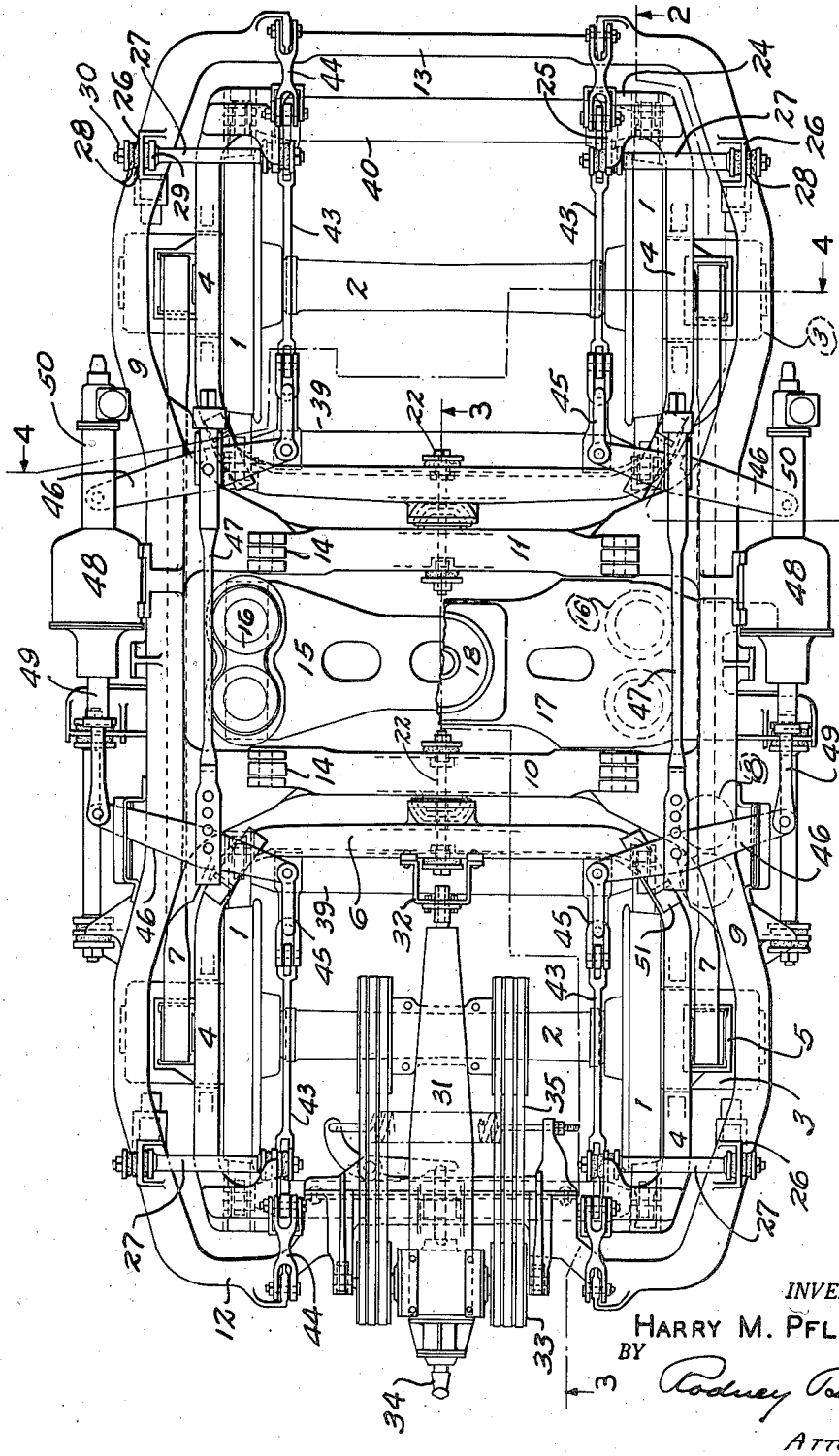

2,365,723

UNITED STATES PATENT OFFICE 2,365,723

RAILWAY TRUCK STRUCTURE

Harry M. Pflager, St. Louis, Mo., assignor to General Steel Castings Corporation, Granite City, Ill., a corporation of Delaware Application March 16, 1942, Serial No. 434,898

20 Claims. (Cl. 188—207)

The invention relates to railway rolling stock, and more particularly to the relation of the truck brake gear and its operating parts to associated truck structure and also to an electric generator or generator drive device on the truck.

In Patent No. 2,276,336, issued to the present inventor since the filing of the present application, there is shown a four-wheeled truck with equalizers extending between the journal boxes at the same side of the truck and provided with springs supporting the truck frame in the usual manner, there being a brake gear supporting frame mounted on each axle and movable vertically with the axle and wheels independently of the spring-supported load carrying frame. This arrangement relieves the load carrying frame of a substantial portion of the shocks and forces arising from the application and release of the brakes. However, the brake operating cylinder and the main lever to which its piston is connected are mounted upon the load carrying frame and the brake dead levers are mounted upon the brake gear carrying frame. Hence there are some shocks transmitted to the load carrying frame, and when the brakes are applied there is a thrust between the two frames tending to move them relative to each other longitudinally of the truck. One of the objects of the present invention is to further relieve the load carrying frame of shocks and forces arising from the application and release of the brakes and to avoid the above-mentioned thrusts arising from the application of the brakes.

In Patent No. 2,276,337, issued to the present inventor since the filing of the present application, there is shown a similar truck construction but with the brake operating cylinder mounted upon the brake gear carrying frame. This patent also discloses the additional feature of an electric generator structure carried upon the brake gear carrying frame. This arrangement results in an undesirable amount of unsprung weight on the wheeled axles. It is a further object of the present invention to carry the electric generator structure, as well as the brake operating cylinder, on the truck main frame so as to keep the unsprung weight as low as possible and to construct the brake gear carrying frame to accommodate the mounting of the generator structure on the load carrying frame. It is also desirable to mount the generator structure on the truck load carrying frame so that the driving unit moves as nearly as possible in unison with the vehicle body.

Another object of the present invention is to resist and absorb forces tending to move the load carrying frame and the brake frame relative to each other longitudinally of the truck due directly to the thrust of the brake operating power device, and to better adapt the brake parts to the relative vertical movement between the brake frame and the load carrying frame, upon which the brake power device is mounted.

Another object of the present invention is to decrease or eliminate movement of the load carrying frame transversely of the truck relative to the brake gear carrying frame arranged to accommodate a generator device supported on the load carrying frame. This is accomplished by providing transverse anchor rods between the load carrying frame and the outer end portions of a U-shaped brake frame and by providing resilient means on the anchor rods to cushion lateral shocks while permitting vertical movement of the brake frame relative to the load carrying frame. In addition to the transverse anchor rods, a rubber insulated connection is provided between the center transom of the load carrying frame and the transverse member of the brake frame at a point located on the longitudinal center line of the truck, such connection having concavo-convex interfitting elements to accommodate angular movements of the brake frame and the load carrying frame in transverse and longitudinal vertical planes.

These general objectives and other detail objects as will appear from the following description are attained by the structure illustrated in the accompanying drawings, in which—

Figure 1 is a top view of a railway four-wheel truck of the type described.

Figure 2 is in part a side elevation and in part a longitudinal vertical section of the truck taken approximately on the line 2—2 of Figure 1.

Figure 3 is a longitudinal vertical section taken approximately on the line 3—3 of Figure 1.

Figure 4 is a transverse vertical section taken approximately on the line 4—4 of Figure 1.

Figure 5 is a detail end view of one corner of the truck.

Figure 6 is a detail transverse section end view taken approximately on the line 4—4 of Figure 1 but illustrating a different arrangement of certain parts of the structure.

The truck illustrated in the drawings includes the usual wheels 1 mounted on axles 2 which carry journal boxes 3. Mounted on each wheeled axle unit is a U-shaped brake frame comprising side members 4, with outwardly extending flanges 5 resting directly upon the journal boxes, and a transverse transom 6 connecting the ends of members 4 nearest the middle of the truck.

Equalizers 7 extend between the journal boxes at the same side of the truck with their end portions resting on the brake gear frame flanges 5. Coil springs 8, mounted on equalizers 7, support the truck load carrying frame in the usual manner. The truck frame includes wheel pieces 9, disposed in the same general longitudinal vertical plane as the journal boxes, center transverse transoms 10 and 11, and end transverse transoms 12 and 13. Swing hangers 14 are pivotally suspended from transoms 10 and 11 and carry a spring plank 15 which mounts coil spring 16 on which the truck bolster 17 is supported. Bolster 17 supports the car body through its center plate 18. The parts so far described correspond generally to corresponding parts in the above-mentioned applications.

The transom 6 of each brake gear frame is connected to the adjacent load carrying frame transom by concavo-convex interfitting elements 19 and 20 respectively (Figure 3), there being a liner 21 of rubber-like material between them and a bolt 22 extending through the transoms of the two frames and holding them in assembled relation. Yielding pads 23 between the bolt head and nut and the adjacent transom elements cooperate with liner 21 to provide a firm but yielding connection between the parts.

The outer ends of the brake gear frame side members 4 are provided with brackets 24 extending towards the center line of the car and terminating in upstanding flanges 25. Upstanding flanges 26 are provided on the adjacent portions of the load carrying frame wheel pieces. Anchor rods 27 extend transversely of the car and through flanges 25 and 26 and include yielding pads 28 clamped between flanges 25 and 26 and collars 29 and nuts 30 on rods 27. These devices are constructed in substantial accordance with the disclosure in V. L. Green Reissue Patent No. 21,987, issued December 30, 1941.

Each pair of anchor rods and the connections 19, 20, 21, 22 provide for tilting of the load carrying frame and the brake gear carrying frame in vertical planes extending transversely and longitudinally of the truck and cushion forces transmitted horizontally between the frames. The portions of the frames near the end of the truck are substantially free to move vertically relative to each other so that the brake gear carrying frame may move with the journal boxes while the load carrying frame may move relative to the journal boxes under the action of its supporting springs 8.

A generator drive unit is positioned at one end of the truck and includes a support and guide plate 31 resting on transom 12 with its inner end secured by bracket 32 to transom 6 of the brake gear carrying frame. The outer end of plate 31 extends beyond transom 12 and carries a gear box which mounts a transverse shaft, bearing pulleys 33, and a longitudinally disposed drive shaft 34 which has a connection (not shown) to a generator (not shown) on the vehicle body. Belts 35 connect pulleys 33 with drive pulleys 36 on the adjacent axle 2.

The truck load carrying frame transom 12 is depressed at the longitudinal center of the truck to accommodate the drive unit.

Suspended from the brake gear carrying frame are brake hangers 37 and 38, and brake beams 39 and 40 extend from side to side of the truck and are carried on the lower ends of hangers 38. Brake levers 41 and 42 have their lower ends connected to beams 39 and 40 respectively and extend upwardly therefrom and are connected intermediate their ends by a transverse member 43. The upper end of each dead lever 42 is fulcrumed to the adjacent transom of the load carrying frame by a link 44. The upper end of each live lever 41 is connected by articulated linkage 45 to the inner end of a horizontally disposed power lever 46. A connection rod 47 extends between the intermediate portions of power levers 46 at the same side of the truck and the outer ends of the power levers are pivoted to a brake operating power device comprising an air cylinder 48, its piston rod 49 and a slack adjuster 50.

The inner end portion of each power lever 46 is supported by a Z-shaped bracket 51 mounted on a side member 4 of the brake gear carrying frame. Thus power lever 46 may tilt in a vertical plane permitting its inner end to raise and lower with the brake gear mounted on the brake gear carrying frame.

The above-described construction provides for the relatively free floating movement of the wheeled axle unit and the load carrying frame relative to each other during normal travel of the vehicle. When the brakes are applied, the connections between the frames will yield to avoid undue transmission of shocks resulting from any tendency to chatter or to the tilting of the brake carrying frame in a plane extending longitudinally of the truck or in a plane extending transversely of the truck or to forces thrusting the brake frame longitudinally and transversely of the truck. Since both ends and the central power-applying means of each individual brake system on each side of the truck is anchored to the load carrying frame, the reactions resulting from the application of the brake balance each other instead of resulting in thrusting the load carrying frame and the brake frame in opposite directions as would follow the anchorage of the dead lever to the brake gear carrying frame, as indicated in the above-mentioned applications.

By supporting the generator drive unit on the load carrying frame, instead of on the brake gear carrying frame as indicated in said Patent No. 2,276,337, the drive unit moves more nearly in unison with the vehicle body which carries the generator, thereby avoiding unnecessary relative movement between these parts, as would result from the mounting of the drive unit on the brake gear carrying frame. This arrangement also reduces the unsprung weight applied to the wheel and axle units.

The elimination of a cross member at the outer ends of the brake gear carrying frame provides additional space for the generator drive unit. Terminating the ends of the side members of the brake gear carrying frame inwardly from the end of the truck and positioning the transverse anchor rods 27 adjacent to the journal boxes reduce angular movement or inclination of the anchor rods due to the movement between the connected parts and provide ample space for clearance between the anchor rod and the linkage 44 connecting the dead lever and the load carrying frame.

The transmission of forces between the load carrying frame and the brake gear carrying frame through elements 19, 20, 21, 22, 23 are accommodated by distortion of the rubber under shearing strain in arcuate directions when there is angular movement between the two frames.

It will be understood that the details of the construction may be varied in many ways without departing from the spirit of the invention and that some of the features described may be used without necessarily including the other features. For example, the inner ends of the power levers may be supported from the load carrying frame, as illustrated in Figure 6, in which a bracket plate 61 is secured to wheel piece 9 and extends inwardly therefrom over the adjacent portion of the brake gear carrying frame 4 to support the power lever 46 and the adjacent live lever 41. In this arrangement relative vertical movements of the brake frame and load carrying frame is accommodated by the tilting action of the links 45 between the inner ends of levers 46 and the upper ends of the live levers 41 without tilting action of horizontal levers 46. The exclusive use of these and other modifications coming within the scope of the claims is contemplated.

What is claimed is:

1. In a railway truck, a wheeled axle unit, journal boxes thereon, a load carrying frame and a brake gear carrying frame supported from said journal boxes and movable relative to each other, brake elements applicable to the wheel and axle unit and supported by the brake gear carrying frame, and a leverage system for the brake gear and having its power applying means and dead end anchored to the load carrying frame and having a portion operatively connected to said elements, there being yielding connections between the brake gear carrying frame and the load carrying frame to hold them against relative movement from their normal operating positions transversely of the truck.

2. Structure as described in claim 1 in which the yielding connections between the brake gear carrying frame and the load carrying frame accommodate relative vertical movements of said frames.

3. In a railway truck, a wheeled axle unit, journal boxes thereon, a load carrying frame and a brake gear carrying frame supported from said journal boxes and movable relative to each other, the load carrying frame being free of direct contact with the journal boxes and being positioned relative to the same horizontally of the truck by yielding connections to the brake gear carrying frame, brake elements applicable to the wheel and axle unit and supported by the brake gear carrying frame, and a brake operating power device supported by the truck load carrying frame, there being an operative connection between said device and said brake elements including a dead lever fulcrumed to said load carrying frame.

4. Structure as described in claim 3 in which the dead lever is supported from the brake gear carrying frame and is fulcrumed to the load carrying frame by a link having pivotal connections to the load carrying frame and to the dead lever.

5. In a railway truck, a wheeled axle unit, journal boxes thereon, a load carrying frame and a brake gear carrying frame supported from said journal boxes and movable relative to each other, brake elements applicable to the wheel and axle unit and supported by the brake gear carrying frame, and a brake operating power device supported by the truck load carrying frame, there being an operative connection between said device and said brake elements including a dead lever fulcrumed to said load carrying frame and positioned between the end of the truck frame and the adjacent wheeled axle unit, there being an anchor rod extending transversely of the truck between said dead lever and the adjacent wheeled axle unit and having its ends connected to said frames and positioning the latter relative to each other transversely of the truck.

6. In a railway truck, a wheeled axle unit, journal boxes thereon, a load carrying frame and a brake gear carrying frame supported from said journal boxes and movable vertically relative to each other, brake elements applicable to the wheel and axle unit and supported by the brake gear carrying frame, a brake operating power device supported by the load carrying frame, a horizontally disposed lever connected to said device and to said brake elements and supported so as to tilt in a vertical plane to accommodate relative vertical movements of said frames and the respective brake elements and power device carried thereby.

7. In a railway truck, a wheeled axle unit, journal boxes thereon, a load carrying frame and a brake gear carrying frame supported from said journal boxes and movable vertically relative to each other, brake elements applicable to the wheel and axle unit and supported by the brake gear carrying frame, a brake operating power device supported by the load carrying frame, a lever connected to said device and to said brake elements, and means on said brake gear carrying frame supporting the portion of said lever connected to said brake elements.

8. In a railway truck, a wheeled axle unit, journal boxes thereon, a load carrying frame and a brake gear carrying frame supported from said journal boxes and movable vertically relative to each other, brake elements applicable to the wheel and axle unit and supported by the brake gear carrying frame, the load carrying frame including a wheel piece extending longitudinally of the truck, a brake operating power device being mounted on said wheel piece, and a lever actuated by said power device and extending from said power device inwardly of the truck beyond said wheel piece and connected to said brake elements, there being a support on said wheel piece for said lever, and a link pivotally connected to the inner end portion of said lever and to said elements.

9. In a railway truck, a wheeled axle unit, journal boxes thereon, a load carrying frame and a brake gear carrying frame supported from said journal boxes and movable vertically relative to each other, each of said frames having a transverse transom adjacent the middle of the truck and having side members extending longitudinally of the truck, braking elements applicable to the wheeled axle unit and supported by said brake gear carrying frame, the outer ends of the side members of the brake gear carrying frame being disconnected from each other, and an anchor rod extending transversely of the truck and having its ends connected to said load carrying frame and to the outer end portion of the adjacent side member of said brake gear carrying frame.

10. In a railway truck, a wheeled axle unit, journal boxes thereon, a load carrying frame and a brake gear carrying frame supported from said journal boxes and movable vertically relative to each other, each of said frames having a transverse transom adjacent the middle of the truck and having side members extending longitudinally of the truck, braking elements applicable to the wheeled axle unit and supported by said brake gear carrying frame, the outer ends of the side members of the brake gear carrying frame being disconnected from each other, and an anchor rod extending transversely of the truck and extending over the adjacent end portion of the corresponding side member of said brake gear carrying frame and connected to said load carrying frame and to the corresponding side member of said brake gear carrying frame.

11. In a railway truck, a wheeled axle unit, journal boxes thereon, a load carrying frame and a brake gear carrying frame supported from said journal boxes and movable relative to each other, brake elements applicable to the wheel and axle unit and supported by the brake gear carrying frame, said frames including individual transverse transoms adjacent to each other and spaced from the wheeled axle unit longitudinally of the truck, and means supporting the transom of the brake gear carrying frame on the transom of the load carrying frame, said means comprising interfitting spherical elements disposed about a horizontal axis, there being a liner of rubber-like material between said elements and adapted to cushion horizontal forces transmitted between them and to distort to yieldingly accommodate relative tilting movement of said frames in longitudinal and transverse vertical planes.

12. In a railway truck, a wheeled axle unit, journal boxes thereon, a load carrying frame and a brake gear carrying frame supported from said journal boxes, said load carrying frame having a transverse transom adjacent to the middle of the truck and said brake gear carrying frame being substantially U shaped with the bottom of the U extending transversely of the truck and adjacent to said transom, there being a connection between said transom and said brake frame to accommodate tilting movements of said brake frame relative to said truck frame, said connection including resilient means to cushion forces transmitted between said transom and said frame, and a transverse anchor rod between the load carrying frame and the outer end portions of each of the side members of said brake gear carrying frame, said anchor rods including resilient means to cushion shocks transmitted between said frames.

13. A structure as described in claim 12 in which the connection between the transom of the load carrying frame and the brake gear carrying frame comprises interfitting concavo-convex elements and said resilient means comprises a rubber-like member between said elements.

14. A structure as described in claim 12 in which a brake dead lever is supported by the brake gear carrying frame and a link pivotally connects the upper portion of the dead lever to the load carrying frame, and in which the transverse anchor rod is located between said dead lever and the adjacent axle unit.

15. In a railway truck, a wheeled axle unit, journal boxes thereon, a load carrying frame and a brake gear carrying frame supported from said journal boxes and movable vertically relative to each other, said load carrying frame including a transverse transom at the end of the truck, said brake gear carrying frame including a transverse transom adjacent the center of the truck and connected to said first-mentioned transom, and a generator device extending longitudinally of the truck and supported upon said transoms.

16. In a railway truck, a wheeled axle unit, journal boxes thereon, a load carrying frame and a brake gear carrying frame supported from said journal boxes and movable vertically relative to each other, said load carrying frame including a transverse transom at the end of the truck and a transverse transom near the center of the truck, said brake gear carrying frame including a transverse transom adjacent the center of the truck and supported by the adjacent transom of the load carrying frame, and a generator device extending longitudinally of the truck and supported upon the transom of said brake gear carrying frame and the end transom of said load carrying frame.

17. In a railway truck, a wheeled axle unit, journal boxes thereon, a load carrying frame and a brake gear carrying frame supported from said journal boxes and movable vertically relative to each other, each of said frames having a transverse transom adjacent the middle of the truck and having side members extending longitudinally of the truck alongside of the side members of the other frame and said load carrying frame having a transverse transom at the end of the truck abreast of the outer ends of the side members of the load carrying frame, and a generator device supported by the transom of the brake gear carrying frame and extending therefrom longitudinally of the truck between said side members and also supported by the end transom of the load carrying frame.

18. In a railway truck, a wheeled axle unit, journal boxes thereon, a truck main frame spring-supported from said unit, a brake gear carrying frame supported from the journal boxes at the opposite ends of said unit so as to move with said unit vertically relative to the truck main frame, brake elements applicable to said unit and supported by said brake gear carrying frame, power means mounted on the truck main frame, and leverage means connected to the power means and anchored to the truck main frame and pivotally connecting the power means and said brake elements.

19. Structure as described in claim 18 which also includes means holding the truck main frame and the brake gear carrying frame against substantial relative movement transversely of the truck.

20. In a railway truck, spaced units each comprising an axle with wheels and journal boxes, equalizers between said units and supported by the boxes at the same side of the truck, a truck main frame spring-supported on said equalizers, an individual brake gear carrying frame associated with each unit and supported from the journal boxes at opposite ends of the unit so as to move with the unit relative to the truck main frame, brake elements applicable to each unit and supported by the corresponding brake gear carrying frame, a power device mounted on the truck main frame, and leverage means connecting the power device to brake elements associated with both brake gear carrying frames and being anchored to the truck main frame, said brake elements being movable with their respective units independently of the relative movement of the truck frame and power device.

H. M. PFLAGER.